United States Patent [19]
Mickelson

[11] 3,755,150
[45] Aug. 28, 1973

[54] HYDROGENATIVE DESULFURIZATION

[75] Inventor: Grant A. Mickelson, Yorba Linda, Calif.

[73] Assignee: Union Oil Company of California, Los Angeles, Calif.

[22] Filed: Apr. 1, 1971

[21] Appl. No.: 130,508

Related U.S. Application Data

[63] Continuation-in-part of Ser. No. 837,340, June 27, 1969, abandoned, which is a continuation-in-part of Ser. No. 761,322, Sept. 20, 1968, abandoned.

[52] U.S. Cl.............. 208/216, 208/217, 208/254, 252/435
[51] Int. Cl............................................ C10g 17/00
[58] Field of Search.................. 208/216, 217, 218, 208/254; 252/435

[56] References Cited
UNITED STATES PATENTS

| | | | |
|---|---|---|---|
| 3,442,794 | 5/1970 | Van Heldew et al. | 208/111 |
| 3,684,695 | 8/1971 | Neel et al. | 208/110 |
| 3,629,146 | 12/1972 | Adams | 252/435 |
| 3,686,137 | 8/1972 | Gatti | 208/254 H |
| 3,617,528 | 11/1971 | Hilfman | 208/216 |
| 3,232,887 | 2/1966 | Pessimisis | 252/435 |
| 3,287,280 | 11/1966 | Colgan et al. | 252/435 |
| 2,608,534 | 8/1952 | Heck | 252/435 |
| 3,609,099 | 9/1971 | Mickelson | 252/435 |
| 3,459,678 | 8/1969 | Hagemeyer, Jr. et al. | 252/435 |
| 3,474,041 | 10/1969 | Kerr | 252/435 X |

*Primary Examiner*—Delbert E. Gantz
*Assistant Examiner*—Juanita M. Nelson
*Attorney*— Milton W. Lee, Milton H. Laird et al.

[57] ABSTRACT

A superior hydrogenative desulfurization process includes reacting hydrogen with a hydrocarbon feed under conditions sufficient to promote said reaction and in the presence of a catalytic combination of at least one molybdenum compound and at least one Group VIII metal or metal compound prepared by impregnating a foraminous refractory oxide support with a highly stable solution of the metal compounds and an acid of phosphorus wherein the impregnating solution has a $P/MoO_3$ weight ratio of about 0.1 to about 0.25 and an initial pH of about 1 to about 2. Even a greater advantage relative to previously available hydrogenative hydrocarbon conversion systems is realized when operating on feed-stocks containing substantial amounts of organonitrogen compounds.

11 Claims, No Drawings

HYDROGENATIVE DESULFURIZATION

This application is a continuation-in-part of my copending application Ser. No. 837,340, filed June 27, 1969, itself a continuation-in-part of my application Ser. No. 761,322, filed Sept. 20, 1968, both of which are now abandoned.

BACKGROUND

The considerable volume of literature published in the area of hydrogenative hydrocarbon conversion over the past several years makes it readily apparent, even upon only cursory investigation, that considerable effort has been devoted to understanding, defining and improving the numerous aspects and characteristics involved in the variety of processes and reaction mechanisms observed in the catalytically promoted reaction of hydrogen with hydrocarbons. Obviously the investigation of catalyst characteristics alone is not sufficient. Quite the contrary, relevant catalyst characteristics such as physical and compositional properties have significance in a commercial context or in most technological contexts with relation to the response that the catalyst exhibits in a given process environment. A brief investigation of the literature thus far published on this subject illustrates that the number of process peramters, which should realistically include catalyst's compositional and physical characteristics, is almost endless. In addition, the significance of some of these parameters changes in response to changes in other variables. For example, the most highly active gasoline hydrocracking catalysts are not the most highly active midbarrel hydrocracking catalysts. Conversely catalysts which exhibit excellent activity in the absence of nitrogen, sulfur, and/or aromatic compounds often exhibit markedly inferior activity, as compared to other compositions, for hydrocracking feedstocks containing substantial amounts of these deleterious materials. In otherwords, the activity and selectivity of a given catalyst must be determined not only in relation to the particular conversions desired, i.e., gasoline hydrocracking, midbarrel hydrocracking, denitrogenation, desulfurization, olefin hydrogenation, aromatics hydrogenation and the like, but must be evalued in view of the system in which the catalyst is expected to perform these objectives.

Obviously all of the problems involved in this area of technology have not yet been solved nor are the several process parameters which compliment or mitigate against the desired objective completely understood. Consequently, the continuing development of hydrogenative hydrocarbon conversion systems is largely a matter of educated guess, empirical evaluation, and a comprehensive understanding of empirical results. The necessity for this approach to the solution of problems such as improving the activity of a given hydrocarbon conversion system, the selectivity of such systems or their tolerance to what might otherwise be process impurities, derives from the lack of an exact understanding of the nature of those factors which limit activity, selectivity and the like or procedures and composition which can be employed to correct those problems once identified without detracting from other desired qualities of the original system.

One area of development in which the aforegoing observations are particularly pertinent is that of the present invention. These systems involve the hydrogenative desulfurization of hydrocarbons, i.e., the reaction of hydrocarbons with either elemental hydrogen or hydrogen supplied by a hydrogen donor, in the presence of a catalyst comprising molybdenum, at least one Group VIII metal compound and phosphorus supported on a refractory inorganic oxide. Compositions containing these and other elements have been the subject of previous investigation. For example, hydrotreating catalysts comprising a Group VIII metal, particularly cobalt or nickel, a Group VI metal, particularly molybdenum or tungsten, or their oxides or sulfides, and phosphorus on an alumina or silica-stabilized alumina base have been disclosed in U.S. Pat. Nos. 3,232,887 and 3,287,280. Those catalysts are discussed as being suitable for denitrogenation or desulfurization of petroleum feedstocks as well as for other hydrogenation reactions. U. S. Pat. No. 3,287,280, in particular, describes methods and impregnating solutions for preparing such catalysts consisting of molybdenum and nickel salts stabilized with phosphoric acid in an aqueous medium. The author discloses the desirability of maintaining the amount and ratio of the constituents of the impregnating solution within relatively narrow ranges. It is this latter observation that is of particular interest in view of the discoveries I have made in an effort to further understand the functions played by each element of these compositions, the interaction of those functions, and the manner in which those functions and interactions are dependent upon the characteristics of a given desulfurization system. Although the results of these investigations, discussed in detail hereinafter, provide some insight into several aspects of the performance of certain catalyst compositions in desulfurization systems, they are unfortunately not sufficiently comprehensive to afford a general understanding of a significant number of influencing factors.

Nevertheless, on the basis of these observations I have been able to establish that the ratio of phosphorus-to-Group VI metal, particularly molybdenum, employed in such solutions is critical, and that the response of the resulting catalysts in hydrogenative conversion systems is substantially enhanced by the use of higher phosphorus-to-molybdenum metal ratios than are employed in the conventional catalyst preparations. In addition, it has been found that proper regulation of the pH of the solution is essential in order to obtain maximum catalytic activity in these systems.

For the catalysis of hydrogenative hydrocarbon conversions such as denitrogenation or desulfurization, the catalytic metals are generally employed in the form of oxides in association with a carrier material. Conventionally, the catalytic metals are applied to the carrier by impregnation with a solution of a compound of the metal, followed by calcination to convert the catalytic metal compounds to oxides. The use of an acid, such as phosphoric acid, as a component of the impregnation solution is disclosed in the above-mentioned U. S. patents. The disclosed function of the acid is the stabilization of the impregnating solution containing both the Group VI and the Group VIII metal compound.

However, I have found that stabilization of the impregnating solution per se affords a solution for only one of the major problems associated with the impregnation of catalysts with Group VIII and Group VI metal components. It is generally recognized that the formation of an evenly distributed layer of the active components such as the metals, oxides, or sulfides throughout the entire surface area of the catalyst support enables the most efficient utilization of the entire catalyst surface area, i.e., contact surface, and thereby provides the most active catalyst in most applications. The impregnation of such catalysts supports with the active components herein discussed by the use of "unstabilized" solutions is subject to several distinct disadvantages. For example, precipitation of the active components from solution even prior to contact with the catalyst support occurs to such a significant extent that a considerable amount of the active components are lost as waste material. The catalysts thus formed do not comprise an evenly distributed active component layer. In addition, the active components are deposited on the support surface in the form of crystalline aggregates forming a heterogeneous non-uniform catalytic surface of inferior activity. This problem becomes particularly acute at higher concentrations. For this and other reasons hereinafter discussed, it has previously been necessary to employ impregnating solutions of such reduced concentration that multiple impregnations were necessary to effect the deposition of the desired amount of active material on the support surface. The multi-step impregnation necessitated by solution instability generally involves the repeated cyclic contact of a support such as silica or alumina with an impregnating solution of relatively low concentration. Intermittent partial drying between impregnation cycles is often necessary to render the deposited materials in the form less susceptible to extraction on subsequent contact with additional impregnating medium. In that this procedure obviously necessitates a rather involved cyclic batch operation it is much less attractive than a simpler single step or continuous impregnation-calcination procedure. However, the use of that simplified procedure is not advisable due to the instability of the impregnating solutions. The catalyst thus produced are of interior activity. This result is believed to be attributable to the distribution of active components on the surface of the support medium in a non-uniform manner relatively large crystalline aggregates.

The same advantages are associated with the use of the so-called "stabilized" impregnating solutions heretofore employed. The stability of those solutions is not sufficient to enable the use of impregnating media of sufficient concentration to deposit the desired amount of active components on a catalyst support in a single step. An even distribution of the desired component concentration cannot be achieved in a single step, e.g., single dip or spray procedure, due to the fact that impregnating solutions of sufficiently high concentration cannot be maintained in a stable form.

I have also observed that even the catalysts produced by multi-step impregnation with the dilute "stabilized" solutions of the prior art are markedly inferior to those obtainable by the procedures herein described. The "stabilized" solutions of the prior art, such as those discussed in U. S. Pat. Nos. 3,232,887 and 3,287,280 are more stable in the classical sense than are solutions containing no stabilizing component. Precipitation from these "stabilized" solutions is less likely in the absence of a support surface, provided the concentration of active components in the impregnating solution is relatively low. However, the active components deposit from these solutions on the support surface as crystallites. This form of deposition is apparently due to the promotion of crystallization of the active components by the support surface. Whatever the cause of crystallite formation, it is understandable that once crystallites form they tend to promote continued crystallization. The result is isolated crystal growth and crystalline aggregate formation in the pores and on the surface. The obvious consequence of this sequence of events is the formation of an unevenly distributed layer of active components on the surface of the support matrix. Such heterogeneity of the catalyst surface is believed to be accountable for the lower activity observed.

In addition to these considerations I have found that analomies observed in the impregnation step are not the only enigmas involved in the formulation of a highly active catalyst having the most desirable tolerance to process and regeneration conditions. The formation of a homogeneous catalyst surface alone does not solve all the problems involved in the preparation of these catalysts. On the contrary, I have observed that the manner in which the catalyst is treated subsequent to impregnation has a dramatic influence on the activity of the finished product. It has previously been considered most expeditious to expose the impregnated support to a preheated furnace in which volatile materials, e.g., water, are rapidly expelled. However, I have discovered that drying of the impregnated support should be conducted at a rate much less than the maximum in order to obtain the most active product. Although the reasons for this result are not known with certainty, it is presumed that either rapid crystallization or steaming of that catalyst are at least partially accountable. It may be that accelerated drying and the corresponding rapid increase in the solution concentration on the surface promote the formation of crystallites and crystalline aggregates.

As discussed in my above-noted copending applications I have discovered that the unique properties of the catalysts herein disclosed are accountable for the markedly superior response of those compositions in hydrogenative desulfurization activity, longer cycle times in desulfurization service, and greater tolerance to organonitrogen compounds.

It is therefore one object of this invention to provide a catalyst and hydrogenative desulfurization system of increased activity. It is another object of this invention to provide an improved method for the hydrogenatively desulfurizaing hydrocarbons. Yet another object of this invention is the provision of an improved system for desulfurizing hydrocarbons in the presence of organonitrogen compounds. Another object of this invention is to increase the cycle time for a hydrogenative desulfurization systems.

DETAILED DESCRIPTION

According to the present invention, it has been found that the use of amounts of phosphoric acid, particularly relative to that of Group VI metal, greater than those taught by the prior art is not only effective in stabilizing the impregnating solution but also substantially enhances the catalytic activity of the finished catalyst. The reason for the enhanced activity of the catalysts of the invention is not known with certainty but is believed to relate to the fact that during the preparation of the catalysts of the invention an amorphous colloidal film of the impregnating materials is deposited on the surface of the support, whereas, in the prior art methods the impregnating materials are deposited in crystalline form. This is believed to result in a more uniform distribution of the molybdenum and nickel ions on the surface of the carrier throughout its pore structure when the process of the invention is employed. It can, in fact, be shown that impregnating solutions prepared according to the process of the invention do not crystallize or precipitate upon standing for months at room temperature. Moreover, no crystallized or precipitated material is formed upon drying the solutions in an evaporating dish or in a thin film on glass, metal or ceramic surfaces; instead, a transparent colloidal film is formed. Solutions outside the limits of concentration and pH of the invention crystallize or precipitate before or during drying and yield opaque films on surfaces. The effectiveness of these procedures is demonstrated by the illustrative examples.

As previously mentioned, the conditions necessary to achieve this result, i.e., the deposition of an amorphous as opposed to crystalline deposits, at the relatively high concentrations necessary to produce a catalyst of the desired composition by a single step impregnation procedure, are quite critical. It is presently felt that the most critical of these process conditions are the pH of the impregnating solution that exists in contact with the catalyst support and the $P/MoO_3$ weight ratio in both the solutions and the final products. The pH necessary to achieve this result in these systems when the $MoO_3$ content exceeds about 17 weight percent must be within the range of 1 to about 2 for the solution initially contacted with the substrate. I have observed that pH values slightly above 2, i.e., up to about 2.5, can be employed without intolerable activity loss at somewhat lower $MoO_3$ concentrations that exist during the latter stages of impregnation when the concentration of active components in the impregnating solution are substantially diminished due to the deposition of those components on the catalyst support. However, the pH should be maintained as close as possible to about 1.5, i.e., from about 1.2 to about 1.8, during the course of the impregnation. Deviations from that midpoint in either direction render the impregnating solution less stable, especially when the $MoO_3$ level exceeds 17 percent. The greater the deviation, the greater the prospect of crystalline deposit formation and crystalline aggregation on the support surface.

In accordance with another embodiment of this invention organosulfur compounds are desulfurized upon contacting with the described catalysts under a superatmospheric hydrogen partial pressure and conditions of temperature, pressure and contact time sufficient to desulfurize at least a substantial proportion of the organosulfur compounds.

In accordance with another embodiment hydrocarbons containing organosulfur compounds are desulfurized by contacting in a reaction system including a hydrocarbon feed, the described catalyst and desulfurization conditions including a superatmospheric hydrogen partial pressure.

In accordance with yet another embodiment of this invention hydrocarbon feeds containing substantial amounts of organosulfur compounds are desulfurized by reacting them with hydrogen under the influence of a superatmospheric hydrogen partial pressure in a reaction system including the selected hydrocarbon feed and the described catalyst under desulfurization conditions of temperature, pressure and contact time. The required amount of phosphorus is most conveniently expressed as the ratio of the weight of elemental phosphorus to the weight of the Group VI metal oxide in the finished catalyst. For example, in the specific examples below, the amount of phosphorus is expressed in terms of the phosphorus-to-molybdenum oxide weight ratio, i.e., $P/MoO_3$. It has now been found that this ratio should be at least about 0.1 in order to achieve the desired improvement in the catalytic activity. On the other hand, the use of too high a concentration of phosphorus generally results in diminished catalytic activity. Consequently, the $P/MoO_3$ ratio in the product should be within the range of 0.1 to about 0.25, preferably from 0.12 to about 0.23.

Catalysts having these compositions are conveniently prepared by multi-step impregnating techniques, e.g., circulation dip, with solutions having $P/MoO_3$ ratios corresponding to those desired in the calcined product. The solutions generally contain from 10 to 30 weight-percent $MoO_3$, 1 to 10 weight-percent of the selected group VIII metal oxide and 1 to about 6 weight-percent phosphorus on an equivalent basis. However, when the simpler, more efficient single step pore saturation method is employed the solution should contain the equivalent of about 17 to about 30, preferably 17 to 24 weight-percent $MoO_3$, 1 to about 8, usually 1 to 8 weight-percent of the selected Group VIII metal oxide and 2 to about 6 weight-percent phosphorus.

When impregnation is accomplished by prolonged immersion of the foraminous base with excess solution, somewhat lower molybdenum concentrations can be employed. For example, the equivalent oxide mole ratios can be within the range of 10 to 17 weight-percent $MoO_3$, 2 to 10 weight-percent of the Group VIII metal oxide and 1 to 4 weight-percent equivalent elemental phosphorus. In these systems the $P/MoO_3$ ratio is preferably somewhat lower than in the pore saturation techniques since phosphorus is deposited at a faster rate than is the molybdenum or Group VIII component. Higher pH, e.g., up to about 2.5, can also be tolerated in the more dilute solutions. However, it is still preferable to assure that the initial pH of even these dilute solutions be within the range of 1 to about 2.

Group VIII metals, suitable for use in the invention are iron, cobalt and nickel, ruthenium, rhodium, palladium, osmium, iridium and platinum. The most attractive Group VIII and Group VI metals in these systems are cobalt, nickel, molybdenum and tungsten. However, these methods exhibit the most significant superiority when employed to prepare catalysts of molybdenum and a Group VIII metal, particularly nickel or cobalt, due to the relative instability of molybdenum containing solutions.

Optimum proportions of the molybdenum and the Group VIII metals in the finished catalyst will vary over a considerable range, again depending on the particular metals, the reaction in which the catalyst is employed, the carrier, etc. Optimum proportions are best determined experimentally and can readily be ascertained by one of ordinary skill in the art. Generally the Gropu VIII metal, based on the oxide, will comprise about 1 to 10, preferably 1 to 6 weight-percent of the catalyst, with the $MoO_3$ comprising about 5 to 40, preferably 10 to 20 weight-percent of the catalyst.

The required phosphorus-to-group VI metal oxide in the finished catalyst is obtained by employing suitable concentrations of the phosphorus acid and the Group VI metal compound in the impregnating solution. Suitable concentrations will, of course, vary considerably with the particular Group VI and Group VIII metal compounds, the phosphorus acid, the carrier, the pH and temperature of the impregnating solution, method of effecting the impregnation, etc., and are best determined empirically. For example, the most preferred acid of phosphorus concentration will not generally be exactly the same in systems employing different forms of molybdenum, nickel or cobalt.

Orthophosphoric acid is the preferred source of the phoshporus component of the catalyst of the invention. However, other phosphorus acids such as metaphosphoric acid, pyrophosphoric acid, phosphorous acid, etc., may be used. The compound of the Group VI metal, preferably molybdenum, can be any one or a combination of a variety of substances which have sufficient solubility in the solution to enable the deposition of the desired amount of metal. Illustrative compounds are the acids, oxides, and the simple and complex salts such as molybdenum trioxide, molybdenum blue, molybdic acid, ammonium dimolybdate, ammonium phosphomolybdate, ammonium heptamolybdate, nickel and cobalt containing molybdates and phosphomolybdates and the like. Molybdenum is presently preferred since the resultant components are the more active conventional components.

The presently preferred Group VIII metal sources are the salts of the desired Group VIII metal with the anions of strong acids. Exemplary of such anions are nitrate, sulfate and the halides, particularly bromide, chloride and fluoride anions. This preference is due primarily to the fact that the strong acid anions dissociate on admixture with the impregnating solution to form the corresponding acid. The strong acids are necessary to reduce the pH to a point within the essential range, i.e., 1 to about 2, at the preferred concentration levels of the respective metal sources. The nitrates are presently the preferred source of the Group VIII metal, nickel nitrate being particularly preferred due to the high activity of the resultant catalyst. Ammonium heptamolybdate is the presently preferred molybdenum source due to its high solubility. The anions other than nitrates are generally less preferred due to significant difficulties associated with their use. For example, the halides, derived from the Group VIII metal halide source, are useful in preparing these compositions but result in the evolution of the acidic halide or hydrogen halide gas upon drying and/or calcination. These materials are highly corrosive and are preferably avoided. The sulfate, on the other hand, is somewhat more difficult to keep in the original solution, making it advisable to employ slightly elevated temperatures, i.e., from 100° to about 150° F., depending on the concentrations of the Group VIII metal sulfate. However, the use of the sulfate salt does have a distinct advantage. In the preparation of sulfided catalyst the conditions of calcination can be controlled so that the sulfate is not completely driven off and can be chemically reduced to produce a sulfided composite having a much more homogeneous distribution of sulfur than could otherwise be achieved. For example, the sulfate reduction can be conveniently carried out by exposing the calcined catalyst to a reducing atmosphere of hydrogen, carbon monoxide, etc.

A portion of the Group VIII metals can also be added in the form of salts of weak acids or as the hydroxides when it is desirable to raise the pH of the impregnating solution by this procedure. For example, if the admixture of the desired amounts of the active metal salts and acid of phosphorus results in a formation of a solution having a pH somewhat lower than desired in a particular application, the pH can be raised by the addition of a Group VIII metal base such as nickel or cobalt hydroxides and carbonates. However, this procedure is not presently preferred in that it requires the commensurate correlation of pH and active metal concentrations. As a result it is presently more preferred to raise the pH when it is initially lower than desired by the addition of a base not having a metal cation, such as ammonia. In any event, where base addition is employed to modify the initial pH, the amount of added base should not be so great as to increase the pH to a value outside the prescribed range.

Several procedural steps can be employed in the impregnation of the catalyst substrate with the compositions referred to. One such method, entitled the spray technique, involves spraying the support with a solution of the desired composition. The single-dip or pore volume method involves contacting the catalyst support with the impregnating solution generally by dipping for a period sufficient to fill the pores with impregnating medium. The application of vacuum is generally preferred in the latter approach. The impregnating solution can more readily displace air trapped in the interior pore volume of the catalyst support at reduced pressures.

The amount of active components retained on the support will depend largely on the pore volume and adsorption capability of the support. Consequently, the characteristics of the support must be taken into account in determining the conditions necessary to obtain a composite of predetermined composition. In general, the preferred supports, e.g., alumina and silica-stabilized alumina, will have pore volumes of 0.6 to about 1.4 cc/gram and adsorption capacity sufficient to retain the desired amount of solution in a single step. Some variation in pore size outside this range will be encountered with other supports within the general class of inorganic refractory oxides, e.g., combinations of silica and alumina such as natural and synthetic crystalline and amorphous aluminosilicates and gels such as silica-alumina and silica-magnesia, to which this invention is applicable. Pore size should also be taken into account in designing the most appropriate systems for the impregnation of a given support. As a general rule more care should be taken in the preparation of relatively large pore size catalysts. Better deposit homogeneity and higher activity are obtained with longer aging times prior to drying and following the more gradual drying procedures. These observations are particularly applicable to the impregnation of acid leached supports in which a portion of the pores are usually fairly large.

Following either of these procedures the impregnated support can be dried and calcined to produce a catalyst having the desired active metal concentrations, provided the concentration of the active metals in the solution is sufficient to deposit the desired amount of active metal compound on the support in a single step. This is one significant advantage of these novel impregnating solutions. The stability of solutions of much higher active component concentration can be maintained for considerable periods even in the presence of inorganic supports. When a single step approach is employed, it is, of course, necessary to incorporate a definite amount of each active constituent into the impregnating medium and maintain the proper ratios between the several constituents per unit volume of solution in order to obtain a finished catalyst of the desired composition. It is also preferable to age the impregnated particles for at least about 30 minutes and preferably up to about 8 hours before drying and calcining. Aging after pore saturation, in the absence of excess solution, under mild conditions, i.e., 70° F., to about 150° F. results in more even distribution of active components and improved activity.

Additional precaution should be taken when a support material containing aluminium ions is exposed to excess solution at relatively low pH. It is believed that certain constituents of the impregnating solution, particularly the acid of phosphorous, react with aluminum and degrade the support, foul the impregnating solution and result in the formation of undesirable chemical forms on the finished catalyst. As a result, the extent of such emersion, particularly in the presence of alumina containing supports, should not be excessive.

Another impregnating method which has found wide application due to the previous necessity for maintaining relatively low active component concentrations is the cyclic or multi-dip procedure wherein the active support is repeatedly contacted with impregnating solution with or without intermittent drying. As previously mentioned, this procedure is less desirable in that it necessitates the use of procedures far more complicated than the single-dip or spray technique. Yet another procedure employed by the prior art, which is not necessary with these impregnating solutions involves a prolonged contacting step at slightly elevated temperatures, e.g., 100° to 150° F., to promote the incorporation of active components onto the support.

In the circulation dip impregnation procedure the impregnating solution may be circulated through a bed or catalyst support particles until the required amount of the active constituents are deposited. A more dilute soltuion having a higher equivalent $P/MoO_3$ ratio and somewhat higher pH may be employed when using this technique and the active component concentration in the circulating solution can be replenished as necessary during the impregnation cycle in order to build up the desired concentration of active components on the support. Equivalent $P/MoO_3$ ratios as low as 0.5 and pH as high as 2.5 may be employed in this process, provided the total concentration of active constituents is reduced by a factor of at least 40 percent so that the equivalent Group VI and Group VIII oxide concentrations do not exceed 14 and 4 weight-percent, respectively. These reduced concentrations are necessitated by the greatly reduced stability of the impregnating solution due to the higher pH and lower $P/MoO_3$ ratios.

The axact concentration of the various constituents in the solution must be determined with regard to the final catalyst composition desired, the pore volume of the support particles and the time of contact of the support particles and the stability of the impregnating solution. A wide range of active component concentrations can be employed although some limitations are imposed by the selected impregnation procedure. Representative concentrations are 10 to 30 weight-percent $MoO_3$ and 1 to 10 weight-percent of the Group VIII oxides. The solutions employed in the pore saturation technique, are necessarily relatively concentrated. Active component concentrations in those systems should be somewhat higher, corresponding to 17 to about 30 weight-percent $MoO_3$ and 2 to about 8 weight-percent of the Group VIII metal oxide, and must be determined in relation to the desired composition of the final product.

Nevertheless, the relative ratio of the Group VIII component to the Group VI component will generally be higher in these dilute systems when an excess of impregnating medium is employed. This is particularly true in the case of molybdenum, tungsten, nickel and cobalt. It has been observed that the Group VI component combines with the substrate more rapidly than does the Group VIII component. Consequently when deposition of the active components onto the substrate is effected at least in part by adsorption — as in the single dip and circulation dip techniques — the Group VIII to Group VI component ratio required to obtain a given final composition is higher than that required in the absence of selective adsorption effects. In contrast, the final Group VIII to Group VI component ratio is determined directly by solution composition when the pore saturation or spray techniques are employed. Selective adsorption effects are not determinative in these systems.

The pH of the solution will generally vary somewhat upon the addition of the Group VIII metal salt. The degree of such variation depends primarily upon the strength of the salt anion. For example, the addition of nickelous nitrate reduces the pH of the solution somewhat. The degree of this pH reduction is greater than that experienced when sulfate salts are employed due to the fact that the nitrate is the anion of a stronger acid than sulfuric acid. As a consequence of this effect, it is generally desirable to further adjust the final pH of the solution after addition of the Group VIII metal salt to the preferred value of from 1 to about 2, preferably from about 1.3 to about 1.7. If the pH of the final solution is lower than about 1 and higher than about 2, the stability of the final solution is reduced with the consequent appearance of precipitates or crystallites in the more concentrated solutions.

The desired stability of the impregnating solution is easily demonstrated by spreading a thin layer of the solution on a glass slide and allowing it to dry gradually under ambient conditions. The stable solutions prepared by the procedure herein described will dry to a completely amorphous transparent film as demonstrated by X-ray diffraction examination of the resultant film. Solutions not meeting these criteria do not form transparent thin films under conditions of this test but become opaque or translucent on drying due to precipitation and/or crystallization.

As illustrated by the examples hereinafter discussed, the catalysts prepared from the less stable impregnating solutions are far less active than those prepared from the solutions herein described. It appears that these differences in activity are attributable, at least in part, to the formation of crystallites and precipitates during impregnation. It is believed that this precipitation and crystallite formation results in the segregation of the several constituents into different crystalline species and the consequent formation of heterogeneous active component deposits. This type of segregation is prevented by the use of the impregnation solutions of this invention.

The term hydrogenative desulfurization is generally well known in the arts of hydrocarbon and chemical processing and broadly is intended to prescribe systems involving the reaction of hydrogen with organosulfur compounds and thereby remove the sulfur from said compounds. These systems are usually employed to remove sulfur from hydrocarbon feeds prior to further reaction or to remove sulfur from products such as fuels, lubricating oils, waxes and the like. In these processes desulfurization usually involves the production of hydrogen sulfide and a hydrocarbon molecule for each molecule of organosulfur compound reacted.

The nature of organosulfur compounds which can be desulfurized by the methods of this invention can vary extensively. For example, a wide variety of organosulfur compounds are found in crude or semirefined hydrocarbon streams. The predominance of the sulfur found in these materials is usually in the form of mercaptans, i.e., thiols, thiophenes including mono- and polybenzothiophenes, and the like.

Essentially any organosulfur compound can be desulfurized by the methods of this invention. However, in most instances the materials which find application in the methods of this invention boil primarily above about 100° F., usually above about 400° F. and generally within the range of about 400° to about 1300° F. The sulfur concentrations found in these feed materials can also vary considerably. For example, although it would not be desirable, it is conceivable to desulfurize a feed containing almost pure organosulfur compounds. However, there is little likelihood that such procedure would be considered attractive from a commercial standpoint. As previously mentioned, most of the feeds employed in these processes are hydrocarbon process streams. These materials usually contain less than about 5 weight-percent sulfur as organosulfur compounds. Sulfur concentrations in excess of about 20 parts per million are the rule while most feedstocks contain an excess of about 100 parts per million and usually an excess of about 0.1 weight-percent sulfur in the form of organosulfur compounds. Most of these feedstocks also contain organonitrogen compounds at levels of at least about 2 parts per million, usually in excess of 10 parts per million and often in excess of 50 parts per million.

As already observed, the methods of this invention are not only superior for desulfurization per se but also exhibit higher reaction rates and longer system cycle times for desulfurization in the presence of organonitrogen compounds. These observations are borne out by the examples discussed hereinafter in more detail.

The desulfurization reaction involved in the methods of this invention is promoted in the presence of superatmospheric hydrogen partial pressures and the described catalysts at conditions sufficient to promote desulfurization. The superiority of these methods is evidenced at all conditions under which desulfurization is effected. However, most commercial systems will operate at temperatures of at least about 400° F., usually about 400° to about 950° F., and pressures of at least about 500 psig, usually about 500 to about 5,000 psig. Hydrogen is usually added in amounts of at least about 50 standard cubic feet per barrel, generally at least about 100 SCF/bbl and commonly about 400 to about 20,000 SCF/bbl. The most attractive hydrogen concentrations usually correspond to hydrogen partial pressures of at least about 50 psi, generally about 100 to about 3,000 psi depending on the feedstock and the nature of the conversion desired. For example, commercial desulfurization conditions with the methods of this invention often include temperatures of 700° to about 800° F. and hydrogen partial pressures of about 750 to about 2,000 psi.

A measureable degree of desulfurization can be achieved at only nominal contact times. However, it is generally desired to effect substantially complete desulfurization or at least a significant degree of desulfurization in a single pass with the methods of this invention. Consequently, contact times are usually on the order of at least about 1 minute and are generally in excess of about 5 minutes. As desulfurization, in a commercial context, is most often conducted in the presence of a fixed bed catalyst system, contact times are often more conveniently expressed in terms of liquid hourly space velocity (LHSV). In these units the contact times usually employed in these methods correspond to liquid hourly space velocities in excess of about 0.1, usually greater than about 0.4 and commonly within the range of about 0.4 to about 15. However, it should also be observed that the systems herein described can also be employed to desulfurize the relatively high boiling feeds which are often more easily processed in liquid phase with a disperse phase catalyst system. In such systems the feedstock, instead of being partially or completely vaporized, is contacted with added hydrogen in the presence of a finely divided catalyst dispersed in the liquid phase to effect the desired degree of desulfurization. The catalyst and hydrocarbon phases are separated following the reaction.

Essentially any degree of desulfurization can be accomplished by the methods of this invention. For example, only nominal conversions of five percent or less equivalent desulfurization can be obtained if desired. However, it is generally preferable to convert the greatest possible proportion of organosulfur compounds in the most expedient manner. As a result, the conditions selected in the methods of this invention are usually sufficient to reduce the sulfur content by at least about 50 percent in a single pass. Product sulfur levels of less than about 100 parts per million are often desired and can be achieved by these methods. The concurrent denitrogenation effected by the hydrogenative desulfurization procedures is usually sufficient to reduce the organonitrogen content to less than 100 and usually less than 20 parts per million equivalent nitrogen.

A further consideration involves the desirability in many instances of effecting the noted degrees of desulfurization and/or denitrogenation in the absence of substantial other modification of the hydrocarbon feed, particularly by hydrocracking. Throughout the hydrocarbon processing art and for the purposes of the methods described herein, hydrocracking is generally considered to involve the production of substantial amounts, i.e., an excess of about 20 percent, of hydrocarbons boiling below the initial boiling point of the feed. Consequently, when it is desired to conduct the methods of this invention in the absence of substantial hydrocracking the desired degree of desulfurization, i.e., an excess of 50 relative percent, is effected in the presence of less than 20 percent conversion of the hydrocarbon feed to hydrocarbon products boiling below the initial feed boiling point. There will of course be some production of inorganic lighter boiling matter such as hydrogen sulfide. A related criterion involves comparison of the number of moles of hydrocarbon product recovered for each 100 moles of hydrocarbon feed. On this basis these methods, when operated to effect desulfurization in the absence of substantial hydrocracking, should produce less than about 110 moles of hydrocarbon product for each 100 moles of hydrocarbon feed.

The following examples serve to more particularly illustrate the invention and the advantages thereof.

Examples 1–7

The catalysts of these examples were all prepared by identical procedures, with the only variables being the proportions of the ingredients, the corresponding impregnation medium, pH and the carrier. Silica-stabilized alumina containing 4.95 percent silica was employed in Examples 1–3. Alumina stabilized with 6.63 percent silica was used in Examples 4–7. The catalysts were prepared by a single-dip procedure in which the carrier, in the form of 1/16 inch pellets, was immersed in an aqueous impregnating solution containing ammonium heptamolybdate, nickelous nitrate hexahydrate and orthophosphoric acid, and having the equivalent oxide concentration reported in Table 1. The particles were contacted for the designated period under about 22 mm Hg and decanted on a No. 5 buchner funnel. The catalysts were then dried and activated by heating at a rate of 50 °F/hr up to 900° F at which they were maintained for 2 hours. Each of the catalysts was activated by the preferred calcination procedure with provision for intimately contacting the impregnated pellets with 6 to 8 SCF of ambient air at about 70° F inlet temperature per pound of catalyst per minute throughout the period of drying and calcination.

The calcination was carried out in a muffle furnace fitted with a fine screen rack on which the specimen was spread in a thin layer, no deeper than about 1/2 inch, through which air was passed during drying and calcining. About 500 to 1,000 grams of wet impregnated catalyst particles were placed on a stainless steel screen 15 x 15 inches square having less than 10 mesh per inch. This screen is supported on a perforated stainless steel tray positioned on a furnace rack in an electrically heated vertical draft oven having an air inlet at the base. Air was blown into the bottom of the furnace at a rate of 4 to 12 standard cubic feet per minute and passed up through the furnace and through the bed of catalyst supported on the porous screen.

The hydrofining activity of each catalyst was determined by passing a mixed gas oil over a fixed bed of catalyst at a temperature of 725° F, a pressure of 1,400 psig, space velocity of 2.0 LHSV and a hydrogen rate of 6,000 SCF/barrel of feed. The mixed gas oil feed had a boiling point range of 400° to 900° F, an API gravity of 23.2 and contained 1.19 weight percent sulfur and 0.195 weight percent nitrogen. The residual basic nitrogen in the liquid product, after scrubbing with 5 percent sodium hydroxide, was monitored and used to calculate percent activity with reference to a standard catalyst by the following equation:

$$\mathrm{Log}\left(\frac{B_N \text{ Feed}}{B_N \text{ Product (from ``X'' Cat.)}}\right) \div \mathrm{Log}\left(\frac{B_N \text{ Feed}}{B_N \text{ Product (from Ref. Cat.)}}\right)$$

$$\times 100 = \% \text{ Activity}$$

Percent denitrogenation was also calculated from the total nitrogen in the product averaged over the last 12 hours on the feed. Results are given in Table I in which the denitrogenation (DeN) activities are expressed as volume percent and weight percent relative to the activity of the reference catalyst. The latter is a commercial hydrotreating catalyst consisting of 16.4% $MoO_3$, 2.9% NiO, and 1.3% P on gamma alumina stabilized with 4.5 weight percent silica. This catalyst was prepared by impregnation of the support with an aqueous system containing 17.4 wt.% $MoO_3$ as ammonium heptamolybdate and 3.5 wt.% NiO as nickel nitrate with a $P/MoO_3$ weight ratio of 0.085 at a pH greater than 2.6.

TABLE I. — COMPOSITIONS AND DENITROGENATION ACTIVITIES OF CATALYSTS OF EXAMPLES

| | Example | | | | | | | Reference Catalyst |
|---|---|---|---|---|---|---|---|---|
| | 1 | 2 | 3 | 4 | 5 | 6 | 7 | |
| Solution composition, wt. percent: | | | | | | | | |
| $MoO_3$ | 17.8 | 25.4 | 20.4 | 20.4 | 20.4 | 17.8 | 19.8 | 17.4 |
| NiO | 3.9 | 4.0 | 3.7 | 3.7 | 3.7 | 3.9 | 4.1 | 3.5 |
| P | 2.5 | 2.3 | 2.8 | 2.8 | 2.8 | 2.50 | 3.5 | 1.5 |
| $P/MoO_3$ | 0.140 | 0.091 | 0.136 | 0.136 | 0.136 | 0.140 | 0.176 | 0.085 |
| pH | 1.9 | 2.0 | 1.3 | 1.3 | 1.3 | 1.9 | 1.3 | 2.6 |
| Contact time, min | 15 | 15 | 15 | 15 | 15 | 120 | 15 | |
| Catalyst composition, wt. percent: | | | | | | | | |
| $MoO_3$ | 15.2 | 21.7 | 18.4 | 18.2 | 19.5 | 18.4 | 16.9 | 16.3 |
| NiO | 2.95 | 3.07 | 2.97 | 2.96 | 2.88 | 2.93 | 2.82 | 2.8 |
| P | 2.81 | 2.40 | 2.96 | 3.04 | 3.41 | 3.26 | 3.58 | 1.30 |
| $P/MoO_3$ | 0.185 | 0.110 | 0.162 | 0.166 | 0.175 | 0.175 | 0.210 | 0.080 |
| Activity, weight of catalyst, g | 164 | 175 | 171 | 171 | 175 | 151 | 167 | 146 |
| Vol. percent of DeN activity | 140 | 123 | 150 | 154 | 137 | 140 | 143 | 100 |
| Wt. percent of DeN activity | 125 | 103 | 128 | 132 | 116 | 127 | 125 | 100 |
| Percent DeN | 95.41 | 94.00 | 96.87 | | 96.21 | 96.56 | 96.67 | 91.8 |

The volume percent activity of the catalyst of Example 1, in which the $P/MoO_3$ ratio was 0.185 and the initial pH of the impregnating solution was 1.9, was 140% of the reference catalyst. The catalyst of Example 2, in which the $P/MoO_3$ weight ratio in the product was only 0.11 and the initial pH of the impregnating medium was 2.0, had an activity of only 123 volume percent of the reference catalyst. This difference was even more pronounced on a weight basis of conversion, i.e., 123 versus 103. The catalyst of Example 1 was the most active even though it contained less active metal. The catalyst of Example 3 prepared at an initial solution pH of 1.3 and a $P/MoO_3$ solution ratio of 0.136 exhibited even higher activity. Example 4, similar to Example 1 in $MoO_3$ content, $P/MoO_3$ ratio and solution pH but employing a different carrier, had an activity similar to Example 1. Example 5, in which the equivalent NiO content was somewhat lower and the initial solution pH was 1.3 had lower activity than Example 4, but was still considerably more active than the low $P/MoO_3$ ratio catalyst of Example 2. Examples 6 and 7 impregnated at pH of 1.9 and 1.3 respectively, show that a further increase in the $P/MoO_3$ ratios to 0.175 and 0.21, respectively, does not result in any further increase in activity. In fact, the activities of these examples was less than that of Examples 3 and 4. The markedly higher activity of the catalysts prepared from impregnating solutions having pH values, P/MoO$_3$ ratios and active component concentrations within the prescribed limits is readily apparent by comparison with the reference catalyst produced under conditions preferred by the prior art.

Examples 8–21

These investigations were conducted to evaluate the effect of impregnating solution composition on the stability of the amorphous deposits formed in accordance with the method of this invention. Each of these solutions was prepared by dissolving ammonium heptamolybdate and phosphoric acid (85%) in water in the proportions reported in Table 2. The indicated amount of nickelous nitrate hexahydrate was then added to the solution. In several instances the pH of the final solution was adjusted upwardly by the addition of ammonium hydroxide in amounts sufficient to produce the indicated pH change. Each solution was aged overnight (12 hours) at 75° F in glass bottles. Equal portions of each fresh solution were also deposited on glass slides and dried gradually at 75° F. Visual observations for both of these tests are reported in Table 2.

presence of precipitate in the aged solution was apparent after 12 hours. Although the degree of instability was reduced by reducing the pH to 1.9 in Example 10, the P/MoO$_3$ weight ratio was so far below the necessary minimums of about 0.1 that some instability was apparent in the dried film and aged solution.

Examples 11 through 14 were conducted at conditions of pH and P/MoO$_3$ ratio within the limits prescribed by this discovery and illustrated remarkable stability in both the dried films and aged solutions. A trace amount of precipitate was observed in the solution of Example 12 after 12 hours of aging at 75° F. However there was no concurrent opaqueness in the dried film and the aged solution was evidently far more stable than the solutions of Examples 8–10. The presence of the trace precipitate in the aged solution of Example 12 is attributed to the addition of sufficient ammonium hydroxide to increase the pH from the original value of 1.25 to the final value of 1.60. It is believed that the presence of ammonium hydroxide in solutions having P/MoO$_3$ ratios approaching the lower prescribed limit of about 0.1, i.e., 0.136 in Example 12, tends to reduce the stability of those solutions. This conclusion is borne out by Example 14 in which sufficient ammonium hydroxide was added to the solution to increase the pH from the original value of 1.1 to a final pH of 1.60. The P/MoO$_3$ ratio in that preparation

TABLE 2

| Example No. | 8 | 9 | 10 | 11 | 12 | 13 | 14 | 15 | 16 | 17 | 18 | 19 | 20 | 21 |
|---|---|---|---|---|---|---|---|---|---|---|---|---|---|---|
| Ammonium heptamolybdate, g | 41.0 | 41.0 | 41.0 | 41.0 | 41.0 | 41.0 | 41.0 | 41.0 | 41.0 | 41.0 | 41.0 | 41.0 | 25.5 | 41.0 |
| MoO$_3$, g | 33.6 | 33.6 | 33.6 | 33.6 | 33.6 | 33.6 | 33.6 | 33.6 | 33.6 | 33.6 | 33.6 | 33.6 | 20.91 | 33.6 |
| Phosphoric acid (85%), g | 7.0 | 10.4 | 12.0 | 17.0 | 17.5 | 22.0 | 22.0 | 27.0 | 27.0 | 17.0 | 22.0 | 27.0 | 6.6 | None |
| P, g | 1.88 | 2.80 | 3.23 | 4.57 | 4.70 | 5.91 | 5.91 | 7.26 | 7.26 | 4.57 | 5.91 | 7.26 | 1.77 | |
| Water approx., ml | 75 | 75 | 75 | 75 | 75 | 75 | 75 | 75 | 75 | 75 | 75 | 75 | 75 | 75 |
| pH | 4.5 | 3.5 | 2.9 | 1.7 | 1.75 | 1.6 | 1.5 | 1.4 | 1.45 | 1.75 | 1.45 | 1.20 | 3.7 | 5–6.0 |
| Nickelous nitrate hexahydrate, g | 24.0 | 24.0 | 24.0 | 24.0 | 24.0 | 24.0 | 24.0 | 24.0 | 24.0 | 24.0 | 24.0 | 24.0 | 16.5 | 24.0 |
| NiO, g | 6.16 | 6.16 | 6.16 | 6.16 | 6.16 | 6.16 | 16.6 | 6.16 | 6.16 | 6.16 | 6.16 | 6.16 | 4.24 | 6.16 |
| Total volume of solution, ml | 120 | 120 | 120 | 120 | 120 | 120 | 120 | 120 | 120 | 110 | 110 | 100 | 120 | 120 |
| Adjust pH with NH$_4$OH | 3.5 | 2.3 | 1.9 | 1.3 | 1.25 | 1.15 | 1.1 | 1.05 | 1.0 | 1.3 | 1.0 | 0.9 | 2.6 | ~4 |
| Final volume, ml | None | None | None | None | 1.60 | None | 1.60 | None | 1.70 | 2.3 | 2.3 | 2.3 | None | None |
| | 120 | 120 | 120 | 120 | 123.5 | 120 | 125 | 120 | 132 | 120 | 121 | 118 | 120 | 120 |
| MoO$_3$, g./cc | 0.2825 | 0.2825 | 0.2825 | 0.2825 | 0.280 | 0.2825 | 0.268 | 0.2825 | 0.255 | 0.2825 | 0.2825 | 0.2825 | 0.1742 | 0.2825 |
| NiO, g./cc | 0.0517 | 0.0517 | 0.0517 | 0.0517 | 0.0515 | 0.0517 | 0.0512 | 0.0517 | 0.047 | 0.0517 | 0.0517 | 0.0517 | 0.0353 | 0.0517 |
| P, g. cc | 0.0157 | 0.0233 | 0.0269 | 0.0384 | 0.0380 | 0.0493 | 0.0472 | 0.0605 | 0.055 | 0.0380 | 0.0472 | 0.0605 | 0.0148 | |
| P MoO$_3$, wt. ratio | 0.056 | 0.083 | 0.095 | 0.136 | 0.136 | 0.176 | 0.176 | 0.216 | 0.216 | 0.136 | 0.176 | 0.216 | 0.085 | 000 |
| Dried film on glass slide | Yellowish opaque | | | | Transparent | | | (1) | (2) | | Film cracking | | (3) | |
| Solution characteristics after 12 hours | (4) | (4) | (4) | (5) | (6) | (5) | Clear | (6) | Clear | (7) | (7) | (7) | (8) | (9) |

[1] Slightly opaque.
[2] Transparent.
[3] Opaque yellow.
[4] Crystalline deposit. Yellow fine crystalline precipitate.
[5] Clear.
[6] Trace sediment.
[7] Glass bottles containing the 3 solutions were lined with crystalline material. pH is too high for stable solution.
[8] Prec. with yellow fines formed slowly.
[9] White precipitate begins to form in 5–10 min. Voluminous after 1 hr.

The impregnating solutions of Examples 8, 9 and 10 were all unstable as indicated by the formation of yellowish opaque precipitates on the glass slides and the formation of yellow fine crystalline deposits in the solutions aged for 12 hours at 75° F. The observed instability is believed to be attributable to the low solution P/MoO$_3$ weight ratios, all of which are below the minimum of about 0.10 necessary to obtain the advantages of this invention. It is interesting to note, however, that these ratios are equivalent to those considered preferable by the prior art. In addition, the solutions of Examples 8 and 9 had pH values of 3.5 and 2.3, respectively, both of which exceed the maximum pH of 2.0 tolerable in these relatively concentrated solutions. The precipitate formation observed in Example 10 at a pH of 1.9 and P/MoO$_3$ weight ratio of 0.095 was much slower than that observed in either Examples 8 or 9, although the dried film definitely exhibited an opaqueness characteristic of a heterogeneous or crystalline system. The was 0.176 which was high enough to counteract the effect of base addition as indicated by the complete absence of any opaqueness or precipitate in either the dried film or aged solution.

Comparison of Examples 15 and 16 provides a dramatic illustration of the advantage obtained by increasing the impregnating solution pH with basic media. The solution of Example 15 having a pH approaching the minimum prescribed limit and a P/MoO$_3$ weight ratio approaching the upper limit prescribed for that parameter was somewhat less stable than the solutions of Examples 11–14. The dried film exhibited a slightly opaque appearance and trace amounts of solid sediment were present in the aged solution. Although solutions of this nature are less preferred, they are still far superior to the solutions envisioned by the prior art and illustrated by Example 20. That solution, having a pH of 2.6 and a P/MoO$_3$ ratio of 0.085 produced an opaque yellow heterogeneous deposit on the glass slide.

The formation of fine yellow particulate matter was evident in the aqueous solution throughout the aging period. The significance of the poor stability of that solution is even more apparent when it is observed that the total metals concentration in Example 20 was about 85 percent less than the stable solution of this invention. Obviously the tendency toward precipitation is greater at higher concentrations. Yet the solutions of this invention remained stable at concentrations about 80 percent higher than those at which substantial instability was observed in Example 20.

It should also be observed that the value of this distinction becomes even more apparent in the context of catalyst preparation systems. The savings in time and investment alone afforded by single-step impregnation techniques are readily apparent. Yet the application of such techniques requires the use of impregnating solutions of relatively high concentrations to enable the deposition of the desired amounts of active components. The markedly superior compositions of this invention enable the use of those systems to produce catalysts of superior activity.

The composition of Example 16 having a $P/MoO_3$ weight ratio identical to Example 15 and an initial pH of 1.0 was further treated by the addition of sufficient ammonium hydroxide to increase the pH of 1.70. The resultant solution was very stable and produced a completely transparent dried film. The aqueous solution remained completely clear even after aging for 12 hours.

The effect of higher pH on the stability of impregnating solutions having active component concentrations sufficient to enable the use of single-step impregnating methods is illustrated by Examples 17–19. Several $P/MoO_3$ ratios were investigated in these examples. All three of these solutions having pH values of 2.3 and $P/MoO_3$ ratios representative of the prescribed range were much less stable than the solutions of Examples 11–16. The formation of opaque cracked films and substantial crystallization in the aged solutions were observed in each instance.

The solution of Example 21 provides a contrast between the stable solutions having pH values and $P/MoO_3$ ratios within the necessary limits to similar prior art solutions prepared at higher pH in the absence of an acid or phosphorus.

Examples 22 and 23

These two examples illustrate the influence of aging the substrate in contact with impregnating medium on the activity of the resultant catalyst.

A solution containing 410 grams of ammonium heptamolybdate, 210 grams of 85% orthophosphoric acid and 220 grams of nickelous nitrate hexahydrate made up to a total volume of 950 ml, and pH adjusted to 1.3 by the addition of several ml of concentrated ammonium hydroxide was dripped from a separatory funnel onto 1,300 grams of silica-stabilized alumina extrudates in an evacuated 4-liter flask. The flask was vigorously shaken by hand during and after the addition of the solution to aid in its distribution. This volume of solution was enough to fill the pore volume of the extrudates and wet them enough so that they adhered to each other and the flask. There was no free liquid in the flask. The agitation under vacuum was continued for 20 minutes. The temperature of the wet extrudates increased from about 77° F to about 122° F during this period of time. The wetted and impregnated extrudates were divided into two parts.

A 1,000 gram portion of the impregnated extrudates which had been aged for 20 minutes was spread on a stainless steel screen tray in the Kress box muffle furnace and dried at 200° F for 16 hours. The dried pellets were then distributed on a stainless steel screen suspended within a top-opening Kress muffle furnace and heated at a controlled rate of 50° F per hour to 900° F, at which temperature they were maintained for two additional hours. Throughout the entire drying and calcination period ambient air, having an inlet temperature of 75° F was passed into the bottom of the furnace and over the pellets at a rate of about 7 standard cubic feet per minute per pound of catalyst.

The remaining material in the 4-liter impregnating flask was aged under ambient conditions with occasional shaking by hand for an additional 100 minutes. The impregnated and aged extrudates were then distributed on a 15 inches square stainless steel tray and placed in an oven at ambient conditions. The oven was turned on and heated to 200° F and the catalyst was held in the oven overnight (16 hours). House vacuum was applied to draw air through the oven during this period. The dried extrudates were then calcined in the Kress box-type muffle as described above. The composition and activity of these two catalysts were determined as in Example 3 and are compared in Table 3.

TABLE 3

| Example numbe | Aging time, minutes | Composition, wt. percent | | | Activity test | |
|---|---|---|---|---|---|---|
| | | MoO | NiO | P | Hours | Percent activity |
| 22 | 30 | 18.4 | 3.09 | 2.97 | 60 | 132 |
| 23 | 120 | 17.7 | 3.13 | 2.94 | 60 | 150 |

The results demonstrate that considerable advantage can be achieved by aging catalysts impregnated by single step pore saturation.

The following two examples are a parallel comparison of the prior art catalyst in the system of this invention further demonstrating the superiority of these systems for desulfurization.

Example 24

The catalyst of this example was similar to the reference catalyst discussed in Table I and was prepared by impregnation of an alumina support stabilized with 4.5 weight-percent silica with an aqueous solution containing ammonium heptamolybdate, nickelous nitrate hexahydrate, cobalt nitrate and orthophosphoric acid in amounts corresponding to about 17 weight-percent $MoO_3$, about 3.5 weight-percent NiO, about 0.35 weight-percent CoO, and about 1.5 weight-percent P. The impregnated composition containing 16.0 weight-percent $MoO_3$, 3.1 weight-percent NiO, 0.2 weight-percent CoO, and about 1.3 weight-percent P on an equivalent total weight basis was then thermally activated in a commercial indirect fired rotary calciner to 950° F with normal air flow.

The activity and tolerance of this composition in desulfurization applications was determined by operating on the blended feedstock hereinafter described at about 90% sulfur conversion per pass at several different temperatures and liquid hourly space velocities. The feedback employed in this operation was a blend of 84 volume percent cat-cycle oil and 16 volume percent heavy cat-gasoline boiling between 350° and 650° F., having an API gravity of 23.0 and containing 1.75 weight-percent original sulfur and 300 parts per million total nitrogen. This feed was contacted with the described catalysts in a single-stage, single pass system with once through hydrogen. Consequently, the hydrogen stream was doped with an amount of carbon diasulfide equivalent to 2.4 volume percent $H_2S$ in the hydrogen feed to approximate commercial desulfurization and denitrogenation conditions existing with hydrogen recycle systems.

The conditions and results of this operation are summarized in Table 4.

Example 25

The catalyst of this example which is representative of the compositions and methods of this invention was prepared by impregnating a gamma alumina support stabilized with 3.0 weight-percent silica with an aqueous solution of ammonium heptamolybdate, nickelous nitrate hexahydrate, and orthophosphoric acid in amounts corresponding to 24.0 weight-percent $MoO_3$, 3.7 weight-percent NiO, and 3.8 weight-percent P having an equivalent $P/MoO_3$ weight ratio of 0.158 and an initial solution pH of 1.2. The catalyst was impregnated by the pore saturation method, aged at least 2 hours, dried to a through-circulation belt dryer in 30–40 minutes and finally calcined to 900°–950° F in an indirect fired rotary calciner with accelerated air flow. The resultant catalyst contained 16.5 weight-percent $MoO_3$, 2.84 weight-percent NiO, and 2.8 weight-percent P corresponding to an equivalent $P/MoO_3$ ratio of 0.167 on equivalent total weight basis. Desulfurization was conducted under conditions paralleling those of Example 24 as summarized in Table 4.

TABLE 4

| Operating conditions: | | | |
|---|---|---|---|
| LHSV, hr.$^{-1}$ | 3.5 | 7.0 | 3.0 |
| Temperature, ° F | 700 | 700–780 | 750–790 |
| $H_2$/oil, s.c.f./bbl | 1,700 | 1,700 | 1,700 |
| Relative deactivation rate, ° F./100 hours: | | | |
| Example 24 | nil | 40 | 12 |
| Example 25 | nil | 24 | 8 |

The data summarized in Table 4 indicate that the deactivation of both catalysts was negligible at relatively mild conditions of 700° F, and 3.5 LHSV. There would definitely be some deactivation for both of these systems at these mild conditions. The length of the operation in this example was not sufficient to allow extrapolation of deactivation rate to a 100 hour run length. However, a dramatic difference in the tolerance of each of these systems in hydrogenative desulfurization application was demonstrated at more severe conditions involving temperatures of 700° to 780° F. and liquid hourly space velocities of 7.0. At these conditions the results demonstrate that the methods of this invention deactivated only 24° F. in 100 hours as compared to 40° F for the comparison method. The deactivation rate in Example 24 was roughly twice that observed in Example 25. About a 60 percent difference was observed at less severe conditions involving approximately the same temperature, e.g., 750° to 770° F., at lower space velocities, e.g., 3.0 LHSV. At these conditions the method of this invention exhibited a deactivation rate corresponding to a temperature increase requirement (TIR) of 8° F. as compared to 12° F. for the system of Example 24.

Several conclusions can be readily derived from these observations. Firstly, it is apparent that the rate of deactivation is greatly accelerated at higher temperatures and/or higher liquid hourly space velocities. In otherwords, the ability of either system to hydrogenatively desulfurize hydrocarbons is reduced at a much higher relative rate at higher temperatures. The same is true at higher liquid hourly space velocities. Secondly, it is apparent that the method of this invention deactivates at a dramatically slower rate than previously available methods. As a consequence, previously available systems require much higher temperatures to maintain the same conversion that can be maintained at lower temperatures with the methods of this invention. This distinction is amplified by the fact that deactivation is greatly accelerated at higher temperatures. Consequently, the activity difference between these two systems is magnified with run-length.

The following four examples further demonstrate the superiority of these methods. All of these examples were conducted on the feedstock having the properties illustrated in Table 5.

TABLE 5

| | |
|---|---|
| Gravity, °API | 17.9 |
| ASTM Distillation, D–1160, ° F.: | |
| IBP/5 | 512/567 |
| 10/20 | 589/610 |
| 30/40 | 638/645 |
| 50/60 | 683/704 |
| 70/80 | 731/757 |
| 90/95 | 806/839 |
| Max./rec, vol. percent | 857/98 |
| Sulfur, X-ray, wt. percent | 3.54 |
| Nitrogen: | |
| Total, wt. percent | 0.183 |
| Basic, wt. percent | 0.0681 |
| Total saturates, wt. percent | 29.1 |
| Total aromatics,[1] wt. percent | 31.6 |
| Total sulfur compounds, wt. percent | 18.2 |
| Monobenzothiophenes | 5.3 |
| Dibenzothiophenes | 2.7 |
| Tribenzothiophenes | 1.4 |
| Atomatic sulfides | 0.5 |
| Alkyl sulfides | 4.3 |
| Thiophenes | 4.0 |

[1] Excludes 9.9% of total aromatics present as sulfur compounds and reported as such.

Example 26

The catalyst of this example was prepared by pore saturation impregnation of a silica-stabilized alumina support containing about 5 weight-percent silica. The impregnating solution contained about 17.4 weight-percent $MoO_3$ as ammonium heptamolybdate, about 3.5 weight-percent NiO as nickelous nitrate hexahydrate and about 1.5 weight-percent P added as orthophosphoric acid. The finished catalyst had a composition equivalent to 15.6 weight-percent $MoO_3$, 3.2 weight-percent NiO, and 1.3 weight-percent P. This catalyst was used to convert the feed identified in Table 5 in a fixed bed catalyst system operating once through with a single stage at 740° F, 1,275 psig, a liquid hourly space velocity (LHSV) of 0.59 and a hydrogen injection rate of 6,000 standard cubic feet per barrel of hydrocarbon feed. The results of this operation are summarized in Table 6.

Example 27

The desulfurization of Example 26 was repeated using the catalyst described in Example 26 and the feedstock identified in Table 5 at a reduced temperature of 7.5° F. to provide a comparison between these methods at somewhat less severe conditions. The results of this operation are also summarized in Table 6.

Example 28

The method demonstrated in this example employed a catalyst prepared by the circulation dip method using a solution containing 13.4 weight-percent MoO₃, about 3.6 weight-percent NiO, about 1.2–1.3 weight-percent P and having an initial pH of about 2.5 and a P/MoO₃ ratio of about 0.11. The finished catalyst had an equivalent composition of 16.6 weight-percent MoO₃, 3.27 weight-percent NiO, and 3.09 weight-percent P on gamma alumina stabilized with 4.5 weight-percent silica. This catalyst was used to convert the feed identified in Table 5 in a single-stage once through system using hydrogen at conditions otherwise identical to those described in Example 26. The results of this operation are summarized in Table 6.

Example 29

The method of Example 28 was repeated at less severe conditions including a temperature of 715° F. to provide a comparison to the method demonstrated in Example 27. The results of this operation are summarized in Table 6 along with the results of Examples 26 through 28.

TABLE 6

| Example No. | 26 | 27 | 28 | 29 |
|---|---|---|---|---|
| Conditions: | | | | |
| Reactor temperature, °F | 740 | 715 | 740 | 715 |
| Reactor pressure, p.s.i.g | 1,275 | 1,275 | 1,275 | 1,275 |
| LHSV, v./v./hr | 0.59 | 0.59 | 0.59 | 0.59 |
| Hydrogen, s.c.f./bbl | 6,000 | 6,000 | 6,000 | 6,000 |
| Product properties: | | | | |
| Full range product: Total nitrogen, p.p.m | 19 | 35 | 0.9 | 1.2 |
| 575° F., plus fraction: | | | | |
| Weight percent of product | 62.2 | 67.2 | 46.0 | 54.6 |
| Sulfur, p.p.m | 28 | 113 | 14 | 39 |

The marked superiority of the methods of this invention as regards desulfurization is further demonstrated by comparison of either Examples 26 and 28 or Examples 27 and 29. Each set of examples was run at identical conditions. The product sulfur concentration was not obtained for the full range product. The sulfur values obtained, as indicated in Table 6, refer to the product boiling above 575° F. One reason for this method of analysis was that only about 7% of the original feed boiled below 575° F. Therefore, it is assumed that all of the feedstock converted to products boiling below 575° F was subjected to such severe hydrogenation conditions as to remove the sulfur therefrom. Conversely it is generally known that the most difficult compounds to desulfurize are the higher molecular weight, higher boiling materials, i.e., those which would be found in the higher boiling fractions. Nevertheless, the amount of total product represented by the 575° F.-plus fraction in Examples 26 through 29 ranged from a low of 46.0 percent in Example 28 to a high of 67.2 percent in Example 27. In all cases it is considered that this amount of product is sufficient to provide a representative indication of the desulfurization activity of the respective methods employed in each of these examples.

The method of this invention in Example 28 reduced the sulfur content to 14 parts per million as compared to 28 parts per million for the comparative system of Exampel 26. On a simple arithmatic basis these results appear to indicate an advantage of about 100 percent for the methods of this invention. However, it should be kept in mind that desulfurization rate as reflected in ultimate sulfur concentration is necessarily a function of the amount of sulfur remaining to be converted. This of course is the case in considering the kinetics of any reaction mechanism other than zero order. Consequently it must be concluded that the method of this invention is even more than 100 percent more active than the comparison method of Exmaple 26. This conclusion is borne out by comparison of Examples 27 and 29 which were conducted at less severe conditions at a temperature of 715° F. At the lower temperatures the remaining sulfur concentrations were somewhat higher indicating a slower rate of conversion for both systems. Nevertheless, the method of this invention reduced the remaining sulfur concentration to 39 parts per million as compared to 113 parts per million for the comparison method of Example 27. This comparison indicates a relative advantage of about 190 percent on a simple arithmatic basis for the method of this invention demonstrating that the apparent distinctions between these methods are indeed amplified at higher remaining reactant concentration levels.

Numerous variations and modifications of the concept of this invention will be apparent to one skilled in the art in view of the aforegoing disclosure and the appended claims.

I claim:

1. The method of hydrogenatively desulfurizing hydrocarbon feeds containing at least about 20 ppm sulfur as organosulfur compounds which comprises reacting said feed with hydrogen under hydrogenative desulfurization conditions including a superatmospheric hydrogen partial pressure and a temperature of at least about 400° F in the presence of a catalytic composition formed by the method including the steps of impregnating a foraminous support with an aqueous impregnating medium which forms on admixture of at least one molybdenum compound selected from ammonium heptamolybdate, molybdic acid, molybdenum trioxide and molybdenum blue, at least one water soluble compound of nickel or cobalt and an acid of phosphorus, in proportions equivalent to about 10 to about 30 weight-percent molybdenum trioxide, about 1 to about 10 weight-percent molybdenum corresponding nickel or cobalt oxide and a P/MoO₃ weight ratio of about 0.1 to about 0.25, and activating the resultant combination.

2. The method of claim 1 wherein said water soluble compound is selected from the nitrates, sulfates, fluorides, carbonates, hydroxides, chlorides and bromides of nickel and cobalt, said molybdenum compound is ammonium heptamolybdate, said acid of phosphorus is orthophosphoric acid, and the initial pH of said solution is within the range of about 1 to about 2.

3. The method of claim 1 wherein said catalytic composition comprises an equivalent MoO₃ content of about 5 to about 40 weight-percent and about 1 to about 10 weight-percent of the corresponding oxide of nickel or cobalt.

4. The method of claim 1 wherein said hydrocarbon feed boils primarily above about 100° F. and is reacted with said hydrogen at a pressure of at least about 500 psig and a liquid hourly space velocity of at least about 0.1 under said superatmospheric hydrogen partial pressure corresponding to a hydrogen concentration of at least about 50 standard cubic feet of hydrogen per barrel of said hydrocarbon sufficient to reduce the organosulfur content of said hydrocarbon by a factor of at least about 50%, said water soluble compound is present in an amount corresponding to about 1 to about 8 weight-percent of the corresponding oxide, and the initial pH of said medium is below about 2.

5. The method of claim 1 wherein said hydrocarbon feed contains at least 2 parts per million nitrogen as organonitrogen compounds and said hydrogenative desulfurization conditions are sufficient to reduce the organosulfur content of said hydrocarbon by a factor of at least about 50%.

6. The method of claim 1 wherein said hydrocarbon feed boils primarily above about 400° F. and contains at least about 100 parts per million sulfur as organosulfur compounds and is reacted with said hydrogen at a pressure of at least about 500 psig for a period of at least about 1 minute under said superatmospheric hydrogen partial pressure corresponding to at least about 100 standard cubic feet of hydrogen per barrel of said hydrocarbon sufficient to reduce the organosulfur content of said hydrocarbon to less than about 100 parts per million, said molybdenum compound is ammonium heptamolybdate, said water soluble compound is selected from the nitrates, carbonates, hydroxides, sulfates and chlorides of nickel and cobalt, the initial pH of said medium is about 1 to about 2, and the concentration of said molybdenum compound in said medium is equivalent to about 17 to about 30 weight-percent $MoO_3$.

7. The method of claim 6 wherein said hydrocarbon feed comprises at least about 10 parts per million nitrogen as organonitrogen compounds.

8. The method of claim 6 wherein said hydrocarbon feed is reacted with said hydrogen under conditions sufficient to reduce said organosulfur content by said factor of at least about 50% while converting less than 20% of said hydrocarbon feed to hydrocarbons boiling below the initial boiling point of said feed.

9. The method of claim 8 wherein the concentration of said molybdenum compound in said medium is equivalent to about 17 to about 24 weight-percent $MoO_3$, the equivalent concentration of said corresponding oxide of nickel or cobalt is about 2 to about 8 weight-percent, said $P/MoO_3$ ratio is within the range of about 0.12 to about 0.23, said initial pH is about 1.2 to about 1.8, and said foraminous support comprises at least one of silica, alumina, magnesia, and combinations thereof.

10. The method of claim 1 wherein said support is aged in contact with said medium for at least about 30 minutes and said catalytic composition is thermally activated in an oxidizing atmosphere at a temperature of about 800° to about 1300° F. prior to contact with said hydrocarbon.

11. The method of hydrogenatively desulfurizing hydrocarbons boiling primarily above about 100° F. and containing at least about 100 parts per million sulfur as organosulfur compounds which comprises reacting said hydrocarbons with hydrogen under hydrogenative desulfurization conditions including a temperature of at least about 400° F., a pressure of at least about 500 psig and a superatmosphereic hydrogen partial pressure corresponding to at least about 50 standard cubic feet of hydrogen per barrel of said hydrocarbon for at least about 1 minute sufficient to reduce the organosulfur content of said hydrocarbon by a factor of at least about 50% in the presence of a catalytic composition formed by the method including the steps of impregnating a foraminous support selected from alumina and silica, and combinations thereof with an aqueous impregnating medium which forms on admixture of water, at least one molybdenum compound selected from ammonium heptamolybdate, molybdic acid, and molybdenum blue at least one water soluble compound of nickel and cobalt selected from the nitrates, carbonates, hydroxides, sulfates and chlorides and orthophosphoric acid in proportions equivalent to about 17 to about 30 weight-percent $MoO_3$, at least about 1 to about 10 weight-percent of the corresponding oxide of nickel or cobalt, a $P/MoO_3$ weight ratio of about 0.1 to about 0.25, and an initial pH of about 1 to about 2 and activating the resultant combination.

* * * * *